United States Patent [19]

Grimaud et al.

[11] Patent Number: 4,899,281

[45] Date of Patent: Feb. 6, 1990

[54] DEVICE FOR TRIGGERING AN EVENT IN PHASE WITH AN ANGULAR POSITION OF A ROTARY COMPONENT AND APPLICATION THEREOF

[75] Inventors: Jean-Michel Grimaud, Grenade; Jean-Marc Nozeran, Toulouse, both of France

[73] Assignee: Bendix Electronics S.A., Toulouse, France

[21] Appl. No.: 223,209

[22] Filed: Jul. 22, 1988

[30] Foreign Application Priority Data

Jul. 24, 1987 [FR] France ................... 87 10539

[51] Int. Cl.$^4$ ............... F02P 5/04; F02P 17/00
[52] U.S. Cl. ................. 364/431.04; 123/417; 123/480; 364/431.03
[58] Field of Search ............ 364/431.03, 431.04, 364/569, 431.05; 123/414, 416, 417, 480, 486; 73/116, 117.3; 377/17, 19; 340/870.24

[56] References Cited

U.S. PATENT DOCUMENTS

| | | | |
|---|---|---|---|
| 3,725,794 | 4/1973 | Asplund ................ | 364/431.04 |
| 4,233,592 | 11/1980 | Leichle ................ | 377/17 |
| 4,321,580 | 3/1982 | Deleris ............... | 340/870.24 |
| 4,324,217 | 4/1982 | Ina et al. ............. | 123/414 |
| 4,553,426 | 11/1985 | Capurka .............. | 123/414 |
| 4,707,791 | 11/1987 | Hmelovsky et al. ..... | 364/569 |
| 4,797,827 | 1/1989 | Cockerham ........... | 377/17 |

Primary Examiner—Parshotam S. Lall
Assistant Examiner—V. Trans
Attorney, Agent, or Firm—Russel C. Wells; George L. Boller

[57] ABSTRACT

An encoder delivers a pulse input signal in phase with equal angular steps of a rotary component, such as a toothed wheel driven by the crankshaft of an internal combustion engine. A missing tooth defines a reference position at which a synchronizing signal is also delivered. A counter is incremented by the pulse input signal and is reset by the synchronizing signal. A comparator compares the count in the counter with a number in a memory circuit to deliver a signal for triggering an event when the count in the counter coincides with the number in the memory circuit. The counter comprises a first counting circuit providing the least significant outputs of the counter and a second counting circuit providing the most significant outputs. The first counting circuit is reset by the input signal, and the second counting circuit by the synchronizing signal.

12 Claims, No Drawings

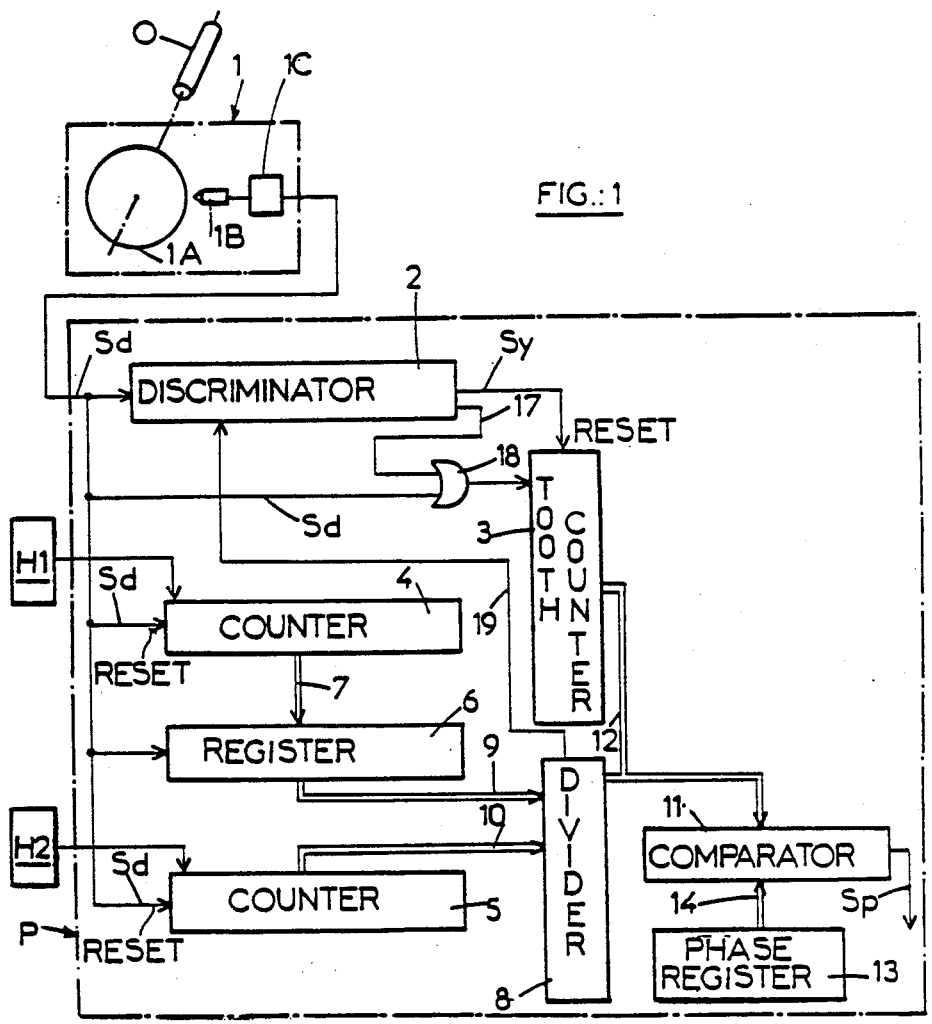
FIG.: 1
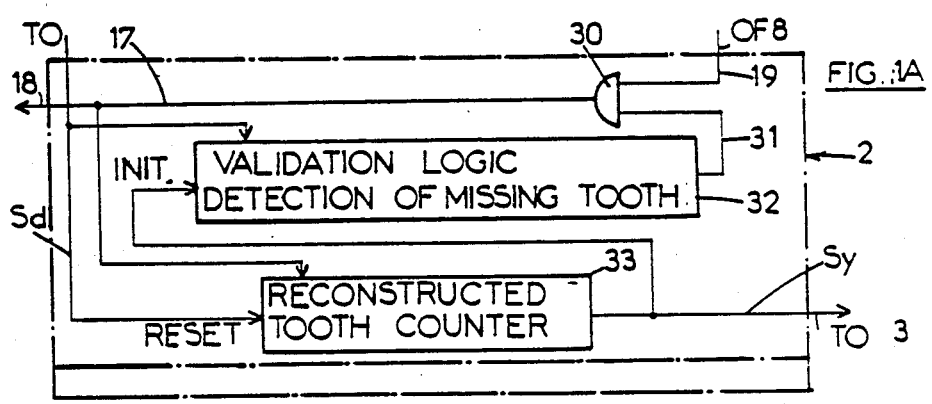
FIG.: 1A

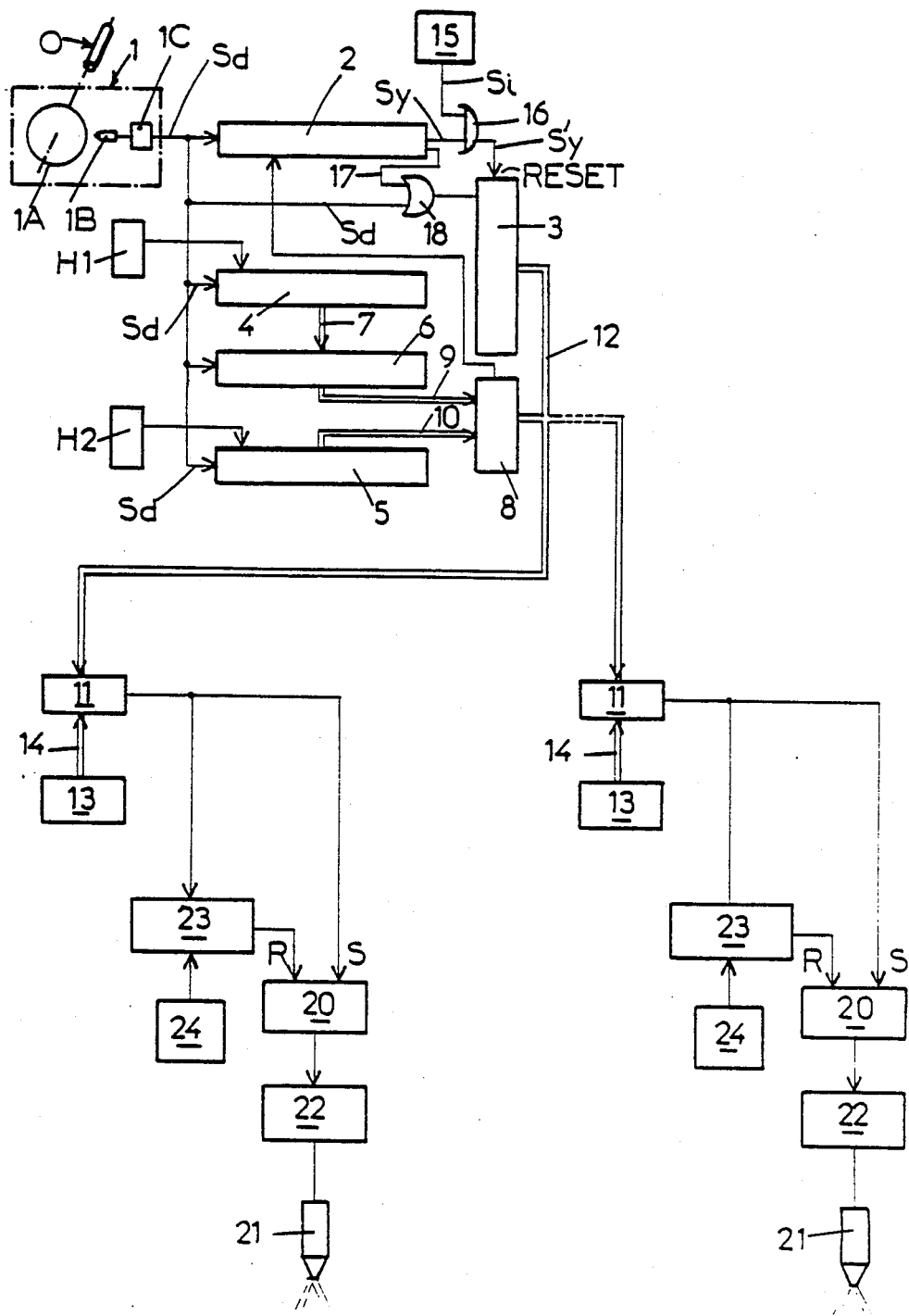
FIG.:2

FIG.:3A
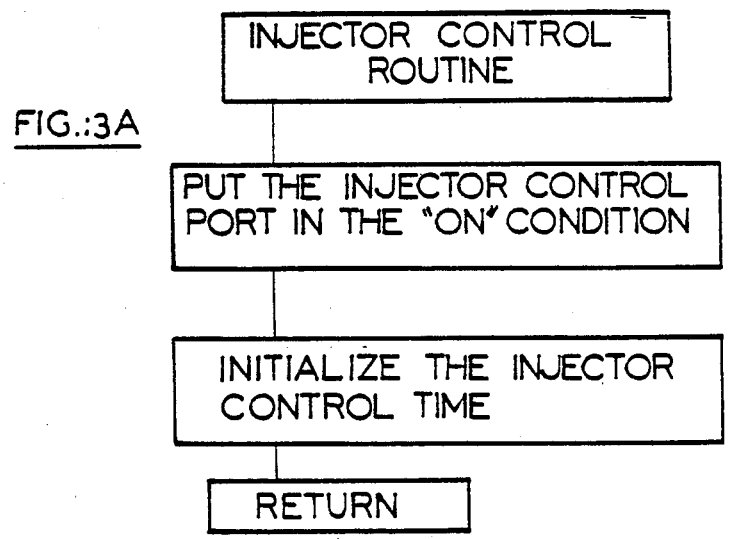
FIG.:3B
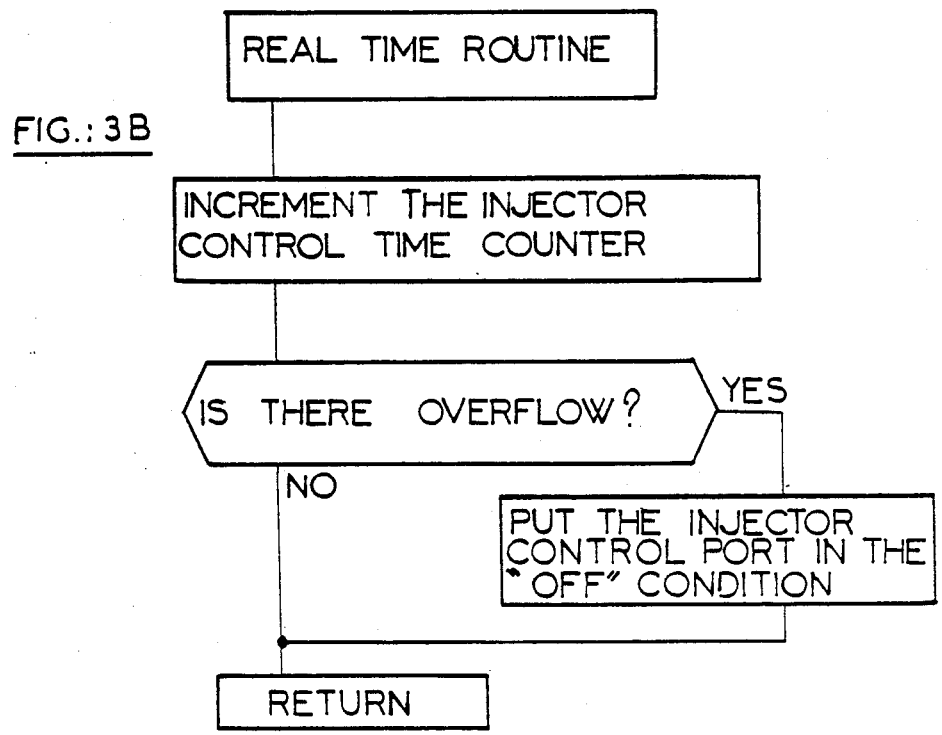

DEVICE FOR TRIGGERING AN EVENT IN PHASE WITH AN ANGULAR POSITION OF A ROTARY COMPONENT AND APPLICATION THEREOF

BACKGROUND OF INVENTION

1. Field of Invention

The invention relates to a device for triggering an event in phase with an angular position of a component driven to execute a rotary movement.

2. Prior Art

Such a device is used, in particular on internal-combustion engines having electronic ignition to ignite, at a particular point of the engine cycle, the explosive mixture compressed within a cylinder, that is to say with an angle of advance determined in relation to the passage of the piston through the top dead center. To this end, it is known to register the angular position of the crankshaft by means of a disc or target which is rotationally connected to the crankshaft and provided, at its periphery, with a series of registration marks passing in front of a sensor which may be of the magnetic, capacitive, optical or some other type.

U.S. Pat. No. 4,321,580 describes a device in which the disc comprises, at its periphery, a succession of teeth and of recesses which are regularly spaced and one or more discontinuities constituting absolute registration marks. The discontinuities may be formed by longer teeth and/or missing teeth. After shaping, the output signal of the sensor is applied to a specific electronic circuit which delivers a certain number of signals, that is to say:

a rectangular tooth signal which is the image of the succession of the teeth and of the recesses at the periphery of the target;

an interpolation signal which is formed by a series of pulses representing the division of the angular interval between two teeth into equal angular fractions;

a synchronizing signal formed of pulses which coincide with the discontinuities of the disc or are phase-shifted by a predetermined angle in relation to said discontinuities, for example in order to identify the top dead center of the pistons.

As described in U.S. Pat. Nos. 4,367,710 and 4,469,081 these signals may be used by a computer which determines the angle of ignition advance as a function of the operating parameters of the engine, and the output stage of which controls the placing of the coil in a conductive condition and its discharge causing the ignition spark. In order to obtain the triggering of the spark, a counter is preloaded with the calculated value of the angle of ignition advance, expressed as the number of pulses of the interpolation signal. This preloading, possibly supplemented by a fixed number if the maximum capacity of the counter exceeds the number of pulses of the interpolation signal between two synchronizing signals, is ensured by the ignition computer under the control of the synchronizing signal. The preloaded counter is then incremented on its most significant inputs by the tooth signal until all its most significant outputs are in the "1" condition. A set of logic gates then permits incrementation of the least significant inputs of the counter by the interpolation signal. When all the least significant outputs are likewise in the "1" condition, that is to say when the counter runs over, the ignition is triggered.

Although operating satisfactorily in the application considered, this device for triggering an event by a counter with preloading does nevertheless involve certain constraints which limit the possibilities thereof.

Thus, a single counter with preloading will be able to ensure the triggering only of a single type of event, for example the ignition, and it will be necessary to provide as many counters with preloading as there are events of different types of events to be triggered.

On the other hand, the actual process of triggering an event in phase with an angular position of the crankshaft is such that the computer must preload the counter at the moment when the synchronizing signal appears. This synchronization of the preloading with the engine cycle is detrimental to the optimal utilization of the computer, the computing speed of which is constant, while the periodicity of the synchronizing signals is a function of the speed of rotation of the engine which varies from a few tens of revolutions per minute in the course of cold starting to several thousand revolutions per minute at maximum speed. If other functions such as the detection of knocking in an angular window situated close to top dead center, the correction of knocking (possibly cylinder by cylinder) the computation of the injection time and the control of the injectors, the regulation of idling, the driving of an automatic gearbox, the control of the opening time of the valves, etc . . . are likewise to be ensured (certain ones of these functions themselves possibly necessitating the triggering of events in phase with the engine and thus aggravating the problem), it will be difficult to cause these to coexist within a single computer. It will then be necessary either to distribute these functions among a plurality of computers, or to use a faster computer which will in reality be of excessive size as compared with what would be strictly necessary for the performance of the computations, setting aside the interruptions which are necessitated by the preloading of the counter or counters for triggering events. In both cases, the cost of the electronics is increased.

SUMMARY OF THE INVENTION

The object of the invention is therefore to provide a device for triggering "phased" events, which permits the elimination of the constraints encountered with the existing devices.

A further object of the invention is to provide a device which permits the convenient provision of the triggering of a succession of events, which may or may not be of different types and which are possibly very close in time.

A yet further object of the invention is to provide a device for triggering a phase event which can be integrated in a programmed microprocessor, without affecting the execution of the programmes performed in the latter.

To this end, the subject of the invention is a device for triggering an event in phase with a determined angular position of a component driven to execute a rotary movement, comprising:

angular encoding means delivering a pulsed input signal in phase with equal angular steps of said component, means for delivering a synchronizing signal in response to the passage of said component through at least one angular reference position and electronic circuits for utilizing said signals ensuring the triggering of said event at said position determined by counting the pulses of the input signal, wherein said circuits comprise:

an angular counter incremented by the input signal and reset to zero by the synchronizing signal to exhibit permanently on these outputs a condition which is the image of the instantaneous angular position of said component in relation to the reference position, at least one memory circuit in which there is stored a number representing said angular position determined in relation to the reference position and at least one comparator which permanently compares the condition of the outputs of the angular counter with that of the outputs of the memory circuit and which delivers a signal for triggering an event in response to the detection of a coincidence between said conditions.

According to a preferred embodiment, in which the electronic circuits comprise interpolation circuits ensuring the electronic subdivision of said angular steps into N=angular fractions, said angular counter comprises:

a first circuit for permanent counting of said subdivisions, which is reset to zero by the pulses of the input signal and the outputs of which form the least significant outputs of the angular counter, and a second counting circuit which is permanently incremented by the pulses of the input signal and reset to zero by the synchronizing signal and the outputs of which form the most significant outputs of the angular counter.

According to a feature, said interpolation circuits comprise:

a first counter which is incremented by a first clock signal and reset to zero by the pulses of the input signal, a register which is loaded with the content of the first counter under the control of the pulses of the input signal, a second counter which is incremented by a second clock signal of frequency N times greater than that of the first clock signal and reset to zero by the pulses of the input signal, and a divider ensuring the division of the instantaneous content of the second counter by that of the register and which forms said first counting circuit.

BRIEF DESCRIPTION OF THE DRAWINGS

Further features and advantages of the invention will become evident from the description which will follow, of embodiments given solely by way of example and illustrated by the accompanying drawings, in which:

FIG. 2 is a block diagram of an injection control circuit driven by the circuit of FIG. 1;

FIGS. 3A and 3B are flow diagrams illustrating the control of injectors by a microprocessor according to a modified embodiment.

DETAILED DESCRIPTION

Figures 1, 1A:
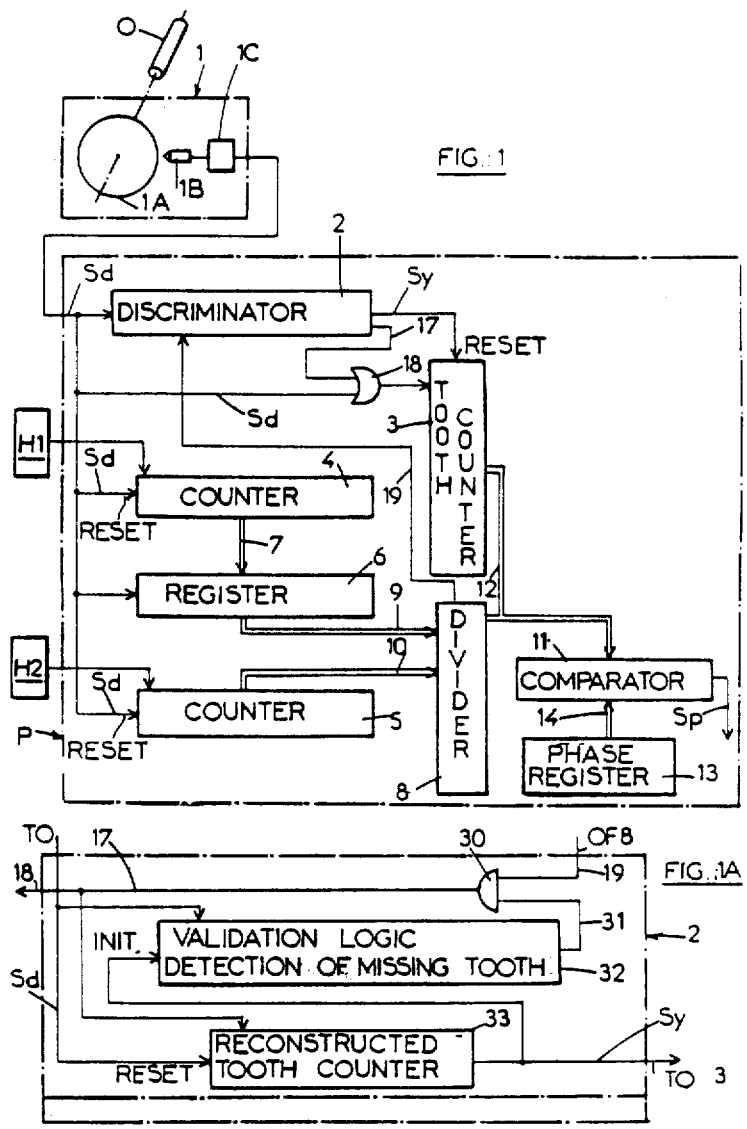
FIGS. 1 and 1A are block diagrams of a device for triggering an event according to the invention.

The device of FIG. 1 consists of a certain number of logic circuits which either may be provided in the form of a specific wired circuit or form part of a programmed microprocessor P. The second preferred embodiment exhibits the advantage of a lower cost and of a greater flexibility of adaptation to different applications.

With the circuits of FIG. 1 there is associated an angular position encoder or detector 1 comprising a disc 1A which is rotationally connected to a rotationally driven component 0, for example the crankshaft of an internal-combustion engine. This disc is equipped, at its periphery, with regularly spaced teeth passing in front of a sensor 1B, for example of variable reluctance. At least one tooth has been eliminated or otherwise modified at the periphery of the disc 1B in order to form an absolute registration mark in a position corresponding to an angular reference position of the component 0. The output signal of the sensor 1B is applied to a shaping circuit 1C which delivers a pulsed signal Sd in phase with the angular steps which the intervals define between the similar fronts of consecutive teeth of the disc. These angular steps are equal, except at the place where one or more teeth have been eliminated or modified. Such a detector is well known, and it will be possible to refer, in particular, to U.S. Pat. No. 4,321,580 for more extensive explanatory comments.

The signal Sd is applied to a discriminator 2, the function of which is, on the one hand, to identify the absolute registration mark and, in response, to emit a synchronizing signal Sy, and, on the other hand, to reconstruct electrically the missing tooth or teeth on its output 17. The discriminator 2 may exhibit the configuration of FIG. 1A or may have a form similar to that described in U.S. Pat. No. 4,321,580 but, in the case of circuits integrated in a microprocessor P, this discrimination may also be carried out by software: by counting clock pulses, the microprocessor P measures the duration of passing, in front of the sensor 1B, of the interval separating two teeth (between ascending fronts or descending fronts) and compares the durations measured over at least two consecutive intervals. Different comparison rules may be applied, especially that indicated in the abovementioned document. The emitted synchronizing signal Sy coincides with an ascending front or a descending front of the tooth signal Sd, depending upon the type of detection adopted, but it may be phase-shifted by a certain number of teeth in relation to the position of the absolute registration mark.

The synchronizing signal Sy delivered by the discriminator 2 is applied to the reset-to-zero input of a tooth counter 3 which receives, via an OR gate 18, the tooth signal Sd and the reconstructed tooth signal 17 at its counting input. The counter 3 does not require preloading and is freely incremented ("free-running") after each reset to zero.

The tooth signal Sd is likewise applied to the reset-to-zero inputs of two counters 4 and 5. The first counter 4 is incremented by a first signal from a clock H1 of frequency F and a second counter 5 by a second signal from a clock H2 of frequency N times greater than that of the first clock signal, where $N=2^n$.

The count present on the output of the first counter 4 is applied to a register 6 via a bus 7. The memory or locking input of the register 6 receives the tooth signal Sd.

The outputs of the register 6 and of the second counter 5 are connected to the inputs of a divider 8 via buses 9 and 10 respectively.

The tooth counter 3 and the divider 8 together form an angular counter and their outputs are connected to a first series of inputs of a comparator 11 via a bus 12. The divider 8 exhibits a most significant output 19 connected to the discriminator 2. Finally, the outputs of a phase register 13 are connected to a second series of inputs of the comparator 11 via a bus 14. The output of the comparator 11 delivers a signal for triggering an event Sp when the numbers applied to its two series of inputs are equal.

FIG. 1A shows an embodiment of the discriminator 2. It comprises an AND gate 30, one input of which is connected to the output 19 of the divider 8 and the output 17 of the AND gate 30 is connected to one of the inputs of the OR gate 18. The other input of the AND gate 30 receives the output 31 of a logic circuit 32 for validating the detection of the missing tooth. This logic circuit 32 counts the pulses of the tooth signal Sd applied to its counting input and it is initialized by the synchronizing signal Sy delivered by the output of a counter 33 which counts the teeth reconstructed electronically at the output 17 of the AND gate 30. The counter 33 is reset to zero by the pulses of the tooth signal Sd.

In operation, the phase register 13 is loaded with a number of angular fractions $\frac{1}{2}^n$ representing the angular position for triggering an event in relation to the synchronizing signal Sy. This angular position may be fixed or variable from one triggering cycle to the next. In the first case, the loading of the register 13 takes place once and for all. In the second, the loading is effected by a computer (which may be the microprocessor P, of which the triggering circuit forms a part) at any instant whatsoever prior to the triggering of the event: in both cases, there is no necessity to provide any preloading of a counter in synchronism with the rotation of the disc 1A.

At each appearance of the synchronizing signal Sy coinciding with a tooth signal Sd, the register 6 stores the count present on the outputs of the counter 4 and the counters 3, 4 and 5 are reset to zero.

The counter 4 then commences to count the pulses of the signal of the clock H1 of frequency F, and the counter 5 those of the signal of the clock H2 of frequency NF. Progressively as the counter 5 is incremented at the frequency NF, its instantaneous content is divided, in the divider 8, by that of the register 6 representing the number of pulses at the frequency F which are counted over the preceding interval or angular step; consequently, the output of the divider 8 is incremented by one unit on each occasion when the disc 1A has turned through an angle representing a fraction 1/N of the angular step separating two teeth.

At the moment when the following tooth is detected, the register 6 is loaded with the count present at the output of the counter 4, the content of the counters 4 and 5 is reduced to zero, the output of the divider 8 passes to zero and the tooth counter 3 is incremented by one unit.

The preceding process is reproduced on the detection of each tooth, so that the condition of the outputs of the angular counter (the least significant and most significant outputs of which are formed respectively by the outputs of the divider 8 and of the tooth counter 3), represents at any instant the instantaneous angular position of the disc in relation to the reference position defined by the absolute registration mark, expressed as a number of fractions $\frac{1}{2}^n$ of the interval or angular step separating two teeth. For example, if $n=3$ is chosen, leading to a division of each interval into 8 equal fractions, and a target having 45 teeth is chosen, one of which has been eliminated, a resolution of 1° will be obtained.

When the count present on the outputs of the angular counter 3, divider 8 reaches that contained in the register 13, the comparator 11 produces the signal Sp which is well in phase with the angular position previously loaded into the register 13.

Moreover, on each pulse of the tooth signal Sd the logic counting circuit 32 is incremented. When its content reaches the total number of teeth of the disc 1A which are to pass in front of the sensor 1B between two consecutive synchronizing signals, overflow takes place and the output 31 passes from the low ("0") condition to the high ("1") condition. This permits it to be ensured that the detection of the missing (or similar) tooth does indeed take place at the moment when the latter passes in front of the sensor 18, and any untimely detection in a different angular position of the disc 1A to be avoided.

In the course of this passing of the missing tooth, the counter 5 is not reset to zero and the divider 8 is incremented beyond N units: when a count N+P is reached, the output 19 of the divider 8 passes to the high condition, just as the output 17 of the AND gate 30. The output 31 is then reduced to the low condition by an appropriate means, before the appearance of the following pulse of the tooth signal Sd: there may be, for example, an appropriate time delay of the circuit 31 or indeed (a variant which had not been represented) a flip-flop RS intercalated between the circuit 32 and the AND gate may be reset to zero by a time-delay circuit triggered by the output of the AND gate 30.

There is therefore electronic reconstruction of the missing tooth, and the latter is utilized to increment the tooth counter 3.

This reconstructed tooth likewise increments the counter 33, which emits the synchronizing signal Sy when overflow takes place after counting a predetermined number of reconstructed teeth. Accordingly, it is thus possible to trigger the synchronizing signal Sy with a desired angular periodicity, for example at each missing tooth, every two, three, . . . k missing teeth, by varying the characteristics of the counter 33. At each triggering of the synchronizing signal Sy, the logic circuit 32 for validation of detection of the missing tooth is reinitialized and the preceding process is repeated.

Finally, it will be noted for reference that, in the example described, the angular position defined by the condition of the outputs of the angular counter 3, 8 during the first angular interval which follows the missing tooth is falsified, since the counter 4 has been incremented, during the passing of the missing tooth, by a number of clock pulses at the frequency F which, at constant speed of the disc, is twice that which is counted over the other intervals. It is, in fact, by this double number, which is then loaded into the register 6, that the content of the counter 5 is divided.

This error is not an adverse factor if there is no event to be triggered over the first angular interval, since it will be eliminated as from the second angular interval. If necessary, it may nevertheless be remedied by prohibiting the storage of the value of the counter 4 in the register 6 when the missing tooth has been detected. In a variant, it is likewise possible to control the resetting to zero of the counter 4 and of the register 6, not by the tooth signal Sd, but by the output of the OR gate 18.

The device described hereinabove finds a particularly advantageous application in the context of the control of the opening of the injectors of an internal-combustion engine in phase with the distribution of the engine. In this application, the device may be adapted in order that the tooth counter 3 should carry out a counting over two engine revolutions (a complete cycle of a four-stroke engine), i.e. 720°. In order to do this, the engine will have to be equipped with a means, such as a sensor 15 (FIG. 2) detecting a registration mark on a camshaft, delivering a signal Si for the identification of a particular cylinder. As the camshaft turns with half the speed of the crankshaft, this signal will be emitted every two engine revolutions. By combining this identification signal Si with the synchronizing signal Sy emanating from the discriminator 2 in an AND gate 16 (FIG. 2), the resetting to zero of the tooth counter 3 will take place only every two revolutions under the control of the new synchronizing signal S'y.

In order to trigger the opening of an injector with a certain angular phase shift in relation to the top dead center of the corresponding piston, it is sufficient to load into the phase register 13 the value which is exhibited by this phase shift in relation to the synchronizing signal S'y. This loading does not need to be effected at a precise moment of the engine cycle; it is sufficient that it should take place before the event happens.

When there is equality between the content of the angular counter (tooth counter 3+divider 8) and of the phase register 13, the comparator 11 delivers the injector opening command signal Sp.

In the example represented in FIG. 2, this signal is applied to the "SET" input S of a flip-flop RS 20, the output of which controls the opening of the injector 21 via a power circuit 22. The injector 21 remains open during a time determined by a counter 23 previously preloaded by the injection computer. The counter 23 is incremented by a clock signal 24 after initialization by the output signal Sp of the comparator 11 and, when it overflows, it emits on the "RESET" input R of the flip-flop 20 a signal which reduces the output of the latter to its initial condition. The injector 21 is then reclosed.

In this configuration, it is necessary to provide a phase register 13, a comparator 11 and a control circuit 20-24 for each injector. Nevertheless, a single angular counter 3, 8 is connected in parallel via the bus 12 to the various phase registers 13 and comparators 11, as represented in FIG. 2.

According to a modified embodiment, the power circuits 22 of the injectors are connected directly to "ports" of the microprocessor P. Such a configuration is traditional and has not been represented. The signal Sp triggers the execution of a subprogram for the control of the opening of the injector (FIG. 3A), which likewise ensures the initialization of a counter determining the previously computed opening time of the injector. A second subprogram (FIG. 3B) ensures the incrementation of the counter for the opening time of the injector. When detection of the overflow of this counter takes place, the injector is reclosed.

In this variant, a single phase register 13 and a single comparator 11 are sufficient, the microprocessor ensuring the switching of the opening command to the command channel of the injector concerned.

In this application to the control of injectors, the device permits the individual triggering of the commencement of the injection of fuel at the location of each cylinder at a given position (fixed or variable) in relation to the cycle of operation of the engine (for example during the inlet phase of each cylinder), and thus the optimization of the operation of the engine when the latter is fed by an injection system of the phased sequential type.

Moreover, in conjunction with the control of the injectors, the same device can be used for the triggering of other events, for example the opening and the closing of an "angular window" for detection of knocking, the placing of the coil in the conductive condition and the ignition of the mixture compressed in a cylinder. To this end, it will be sufficient to provide the desired number of comparators, each associated with a phase register loaded with an angular position determined by the computer for controlling the engine. The utilization of the output signals of the comparators may be undertaken either by means of flip-flops as described in FIG. 2 or by software. In the latter case, and if the phase of the events to be triggered permits this, a single comparator and its associated phase register may possibly be employed to trigger events of different types.

Moreover, whether the angular counter 3, 8 is used only for controlling the opening of the injectors or for the triggering of other events, its resetting to zero does not necessarily take place every two rotations of the engine: it may take place as many times per revolution as there are passages of piston through the top dead center in the engine, for example twice per revolution in the case of a four-cylinder engine by providing the target 1A with a corresponding number of absolute registration marks which are appropriately positioned. As is known per se, the registration of the cylinders is then effected directly by the computer for controlling the engine, by incrementation of a cylinder counter on each detection of an absolute registration mark of the target 1A. This counter is periodically reinitialized in response to the detection of the cylinder identification signal Si.

The device according to the invention thus offers, in various configurations, numerous possibilities of application which it is not appropriate to describe in an exhaustive manner in the present statement.

It will be observed that the angular counter 3, 8 may be a single one, regardless of what may be the number of signals or of events to be triggered. This counter operates freely ("free-running") and, on this basis, it necessitates only a periodic resetting to zero on detection of the synchronizing signal Sy, S'y. The register or registers 13 containing the information relating to the angular position (phase) of triggering of the event may be loaded at any moment whatsoever of the cycle. They are not necessarily reupdated at each cycle, although the preloading of a counter must be reupdated systematically.

The described device permits an optimal utilization of the computer with which it is associated or of which it forms part, since the programs executed are not interrupted for the triggering of an event: when a value is computed, it is loaded into the appropriate register 13, and the computer can continue the execution of the software.

Finally, either the described device can be constructed in the form of a specific circuit or it can form part of a microprocessor: in fact, certain microprocessors (for example, the Motorola 68HC11 microprocessor) have counters and registers organized in a similar manner for time accounting in such a manner as to establish an output controlled automatically by the comparison of the contents of a register and of a counter ("output compare" function). The invention makes an unexpected application thereof (angular counting) which coexists with a traditional control of the microprocessor by fixed-frequency clock signals.

It is self-evident that the described embodiments are only examples and they could be modified, in particular by replacement with technical equivalents, without nevertheless departing from the scope of the invention.

We claim:

1. A device for triggering an event in phase with a predetermined angular position of a component (0) driven to execute a rotational movement, comprising:

angular encoding means delivering a pulsed input signal (Sd) in phase with equal angular steps of the component, means for delivering a synchronizing signal (Sy, S'y) in response to the passage of the component through at least one angular reference position, and electronic circuits for utilizing said signals ensuring the triggering of the event at the position determined by counting the pulses of the input signal, wherein the electronic circuits comprise:

an angular counter incremented from zero by the input signal (Sd) and reset to zero by the synchronizing signal (Sy, S'y) to exhibit permanently on its outputs a condition which is the image of the instantaneous angular position of the component in relation to the reference position, at least one memory circuit in which there is stored a number representing the predetermined angular position in relation to the reference position, means for loading said at least one memory circuit with such a number at a time that is independent of the angular position of the component, and at least one comparator which permanently compares the condition of the outputs of said angular counter with that of the outputs of said memory circuit and which delivers a signal for triggering an event (Sp) in response to the detection of a coincidence between said conditions.

2. A device for triggering an event in phase with a predetermined angular position of a component (0) driven to execute a rotational movement, comprising:

angular encoding means delivering a pulsed input signal (Sd) in phase with equal angular steps of the component, means for delivering a synchronizing signal (Sy, S'y) in response to the passage of the component through at least one angular reference position, and electronic circuits for utilizing said signals ensuring the triggering of the event at the position determined by counting the pulses of the input signal, wherein the electronic circuits comprise:

an angular counter incremented by the input signal (Sd) and reset to zero by the synchronizing signal (Sy, S'y) to exhibit permanently on its outputs a condition which is the image of the instantaneous angular position of the component in relation to the reference position, at least one memory circuit in which there is stored a number representing the predetermined angular position in relation to the reference position, and at least one comparator which permanently compares the condition of the outputs of said angular counter with that of the outputs of said memory circuit and which delivers a signal for triggering an event (Sp) in response to the detection of a coincidence between said conditions; and in which the electronic circuits comprise interpolation circuits ensuring electronic subdivision of said angular steps into N equal angular fractions, wherein said angular counter further comprises:

a first counting circuit for permanent counting of said subdivisions, which is reset to zero by the pulses of the input signal (Sd) and the outputs of which form the least significant outputs of the angular counter, and a second counting circuit which is permanently incremented by the pulses of the input signal (Sd) and reset to zero by the synchronizing signal (Sy, S'y) and the outputs of which form the most significant outputs of the angular counter.

3. The device as claimed in claim 2, wherein said interpolation circuits comprise:

a first counter which is incremented by a first clock signal (F) and reset to zero by the pulses of the input signal (Sd), a register which is loaded with the content of said first counter under the control of the pulses of the input signal (Sd), a second counter which is incremented by a second clock signal (NF) of frequency N times greater than that of the first clock signal and reset to zero by the pulses of the input signal (SD), and a divider ensuring the division of the instantaneous content of said second counter by that of said register and which forms said first counting circuit.

4. The device as claimed in claim 3, wherein said second counting circuit is a counter of the type which is incremented freely.

5. The device as claimed in claim 2, wherein said angular encoding means comprise a disc (1A) provided, at its periphery, with a succession of teeth and of recesses which are regularly distributed, passing in front of a sensor (1B) and wherein said synchronizing means comprise at least one discontinuity in said succession of teeth and of recesses and an electronic discrimination circuit adapted to detect said discontinuity and to deliver, in response, the synchronizing signal (Sy).

6. The device as claimed in claim 5, wherein said electronic discrimination circuit comprises circuits generating pulses in response to the detection of an overflow of said first counting circuit and a third counter which generates the synchronizing signal (Sy) in response to the counting of a predetermined number of the pulses.

7. The device as claim in claim 2, wherein, for the triggering of events in differing determined angular positions of the rotation of said component, it comprises a plurality of comparators each connected, on the one hand, to the outputs of said angular counter and, on the other hand, to a respective memory circuit in which one of the predetermined angular positions is stored.

8. The device as claimed in claim 7, wherein said memory circuit is a register.

9. The device as claimed in claim 2, wherein the electronic circuits of said device form an integral part of a microprocessor.

10. The device as claimed in claim 2, in combination with an internal-combustion engine having fuel injectors and controlled by an electronic computer (P), to control the sequential opening of said injectors in phase with cycles of operation of said internal-combustion engine, wherein the angular position of opening of an injector is loaded in said memory circuit by said electronic computer (P) and the opening of said injector is controlled by said comparator.

11. Combination as claimed in claim 10, wherein a memory circuit and a comparator are associated with each injector.

12. Combination as claimed in claim 10, wherein with the injectors there are associated a single memory circuit and a single comparator, the triggering signal (Sp) of which is switched to each injector by said electronic computer.

* * * * *

UNITED STATES PATENT AND TRADEMARK OFFICE
CERTIFICATE OF CORRECTION

PATENT NO. : 4,899,281
DATED : February 6, 1990
INVENTOR(S) : Jean-Michel Grimaud; Jean-Marc Nozeran It is certified that error appears in the above-identified patent and that said Letters Patent are hereby corrected as shown below:

The Sheets of Drawings consisting of Figs. 1, 1A, 2, 3A, and 3B should be added as shown on the attached sheets Signed and Sealed this Thirty-first Day of December, 1991

*Attest:*

HARRY F. MANBECK, JR.

*Attesting Officer*        *Commissioner of Patents and Trademarks*

United States Patent [19]

Grimaud et al.

[11] Patent Number: 4,899,281
[45] Date of Patent: Feb. 6, 1990

[54] DEVICE FOR TRIGGERING AN EVENT IN PHASE WITH AN ANGULAR POSITION OF A ROTARY COMPONENT AND APPLICATION THEREOF

[75] Inventors: Jean-Michel Grimaud, Grenade; Jean-Marc Nozeran, Toulouse, both of France

[73] Assignee: Bendix Electronics S.A., Toulouse, France

[21] Appl. No.: 223,209

[22] Filed: Jul. 22, 1988

[30] Foreign Application Priority Data

Jul. 24, 1987 [FR] France .............................. 87 10539

[51] Int. Cl.⁴ .......................... F02P 5/04; F02P 17/00
[52] U.S. Cl. ............................. 364/431.04; 123/417; 123/480; 364/431.03
[58] Field of Search ................ 364/431.03, 431.04, 364/569, 431.05; 123/414, 416, 417, 480, 486; 73/116, 117.3; 377/17, 19; 340/870.24

[56] References Cited

U.S. PATENT DOCUMENTS 3,725,794  4/1973  Asplund ................ 364/431.04
4,233,592 11/1980  Leichle .......................... 377/17
4,321,580  3/1982  Deleris ..................... 340/870.24
4,324,217  4/1982  Ina et al. ..................... 123/414
4,553,426 11/1985  Capurka ....................... 123/414
4,707,791 11/1987  Hmelovsky et al. ........... 364/569
4,797,827  1/1989  Cockerham ................... 377/17

Primary Examiner—Parshotam S. Lall
Assistant Examiner—V. Trans
Attorney, Agent, or Firm—Russel C. Wells; George L. Boller

[57] ABSTRACT

An encoder delivers a pulse input signal in phase with equal angular steps of a rotary component, such as a toothed wheel driven by the crankshaft of an internal combustion engine. A missing tooth defines a reference position at which a synchronizing signal is also delivered. A counter is incremented by the pulse input signal and is reset by the synchronizing signal. A comparator compares the count in the counter with a number in a memory circuit to deliver a signal for triggering an event when the count in the counter coincides with the number in the memory circuit. The counter comprises a first counting circuit providing the least significant outputs of the counter and a second counting circuit providing the most significant outputs. The first counting circuit is reset by the input signal, and the second counting circuit by the synchronizing signal.

12 Claims, 3 Drawing Sheets

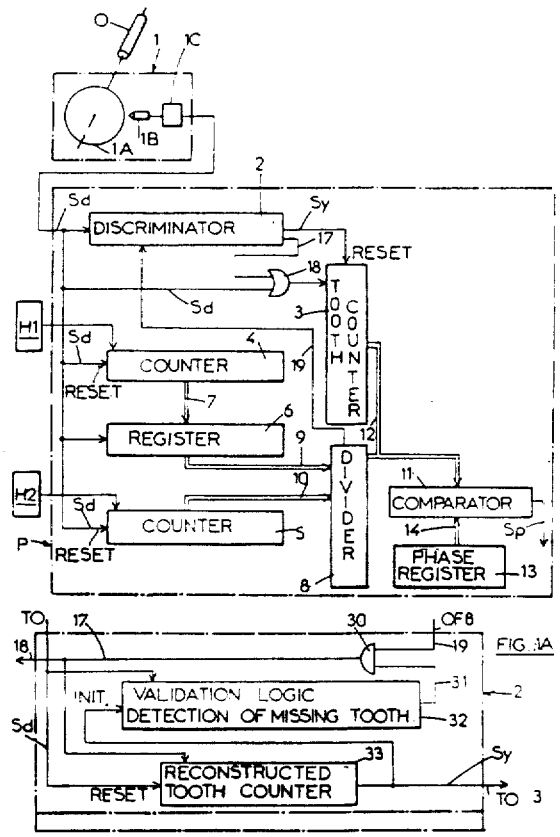

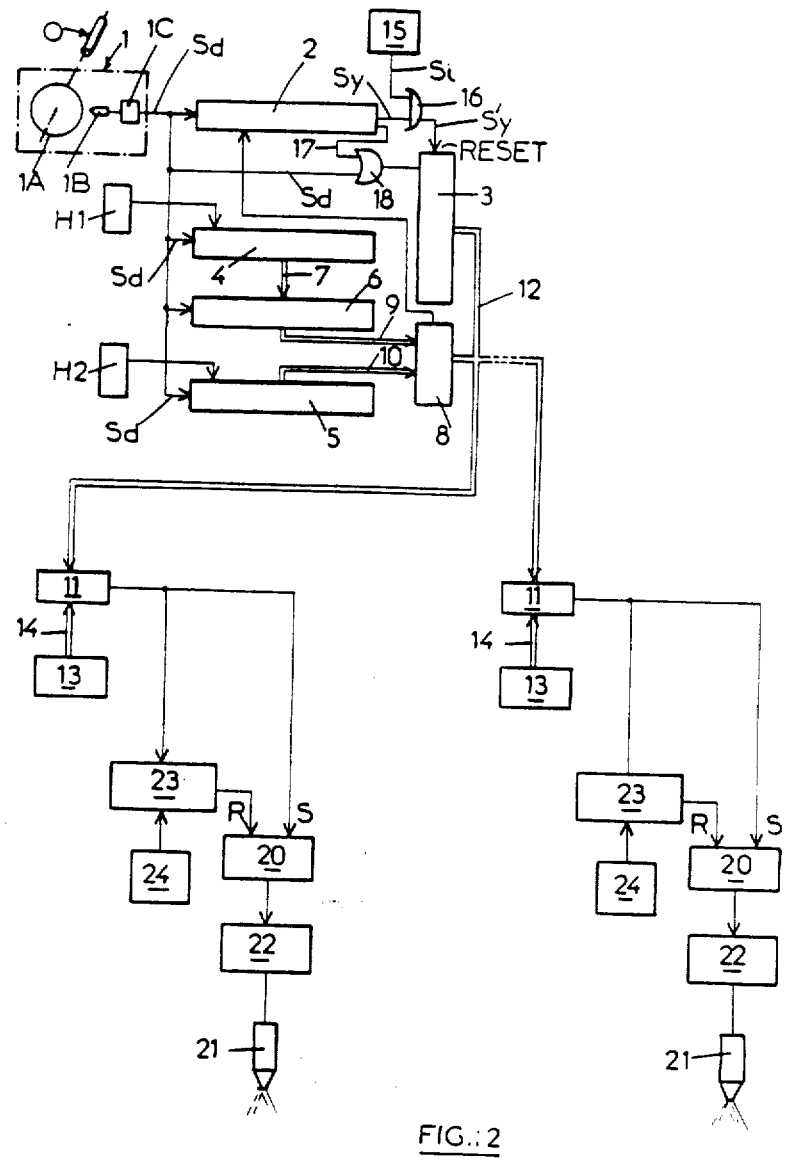
FIG.:2

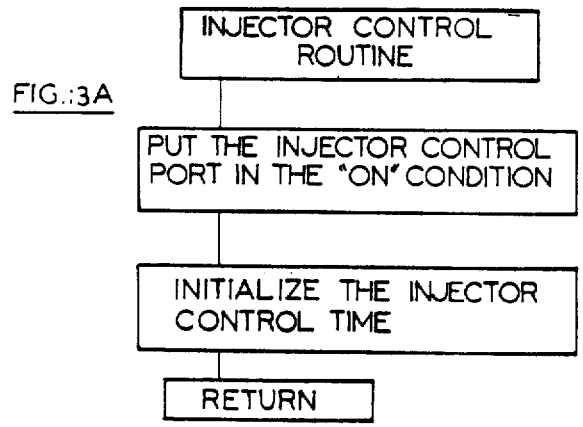
FIG.:3A
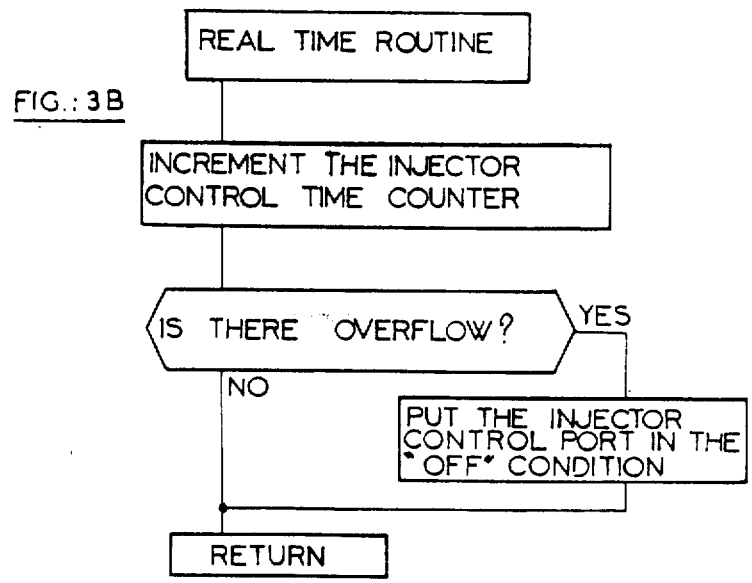
FIG.:3B